(12) United States Patent
Tetzlaff et al.

(10) Patent No.: US 9,966,994 B2
(45) Date of Patent: May 8, 2018

(54) APPARATUS AND METHODS FOR BURST MODE CLOCK AND DATA RECOVERY FOR HIGH SPEED SERIAL COMMUNICATION LINKS

(71) Applicant: Fmax Technologies, Inc., Eden Prairie, MN (US)

(72) Inventors: David Erich Tetzlaff, Minnetonka, MN (US); Iain Ross Mactaggart, Eden Prairie, MN (US)

(73) Assignee: Fmax Technologies, Inc., Eden Prairie, MN (US)

( * ) Notice: Subject to any disclaimer, the term of this patent is extended or adjusted under 35 U.S.C. 154(b) by 0 days. days.

(21) Appl. No.: 15/098,031

(22) Filed: Apr. 13, 2016

(65) Prior Publication Data

US 2016/0301522 A1   Oct. 13, 2016

Related U.S. Application Data

(60) Provisional application No. 62/146,752, filed on Apr. 13, 2015, provisional application No. 62/174,678, filed on Jun. 12, 2015.

(51) Int. Cl.
*H04L 1/00* (2006.01)
*H04B 3/462* (2015.01)
*H04L 12/26* (2006.01)
*H04L 7/033* (2006.01)
*H04L 7/10* (2006.01)

(52) U.S. Cl.
CPC ............... *H04B 3/462* (2013.01); *H04L 1/00* (2013.01); *H04L 7/0338* (2013.01); *H04L 43/022* (2013.01); *H04L 7/10* (2013.01)

(58) Field of Classification Search
CPC .............................. H04L 7/0087; H04B 3/462
See application file for complete search history.

(56) References Cited

U.S. PATENT DOCUMENTS

2010/0135666 A1* 6/2010 Kim ...................... H04L 7/0338
                                                            398/99
2013/0163706 A1* 6/2013 Tai ........................ H04L 7/0338
                                                            375/354

* cited by examiner

*Primary Examiner* — Jaison Joseph
(74) *Attorney, Agent, or Firm* — Schwegman Lundberg & Woessner, P.A.

(57) ABSTRACT

Apparatus and methods are provide for frame synchronization and clock and data recovery. In an example, a method can include receiving initial data of a stream of information, sampling the stream of information a plurality of times per unit interval to provide a plurality of sample intervals, integrating transition information for each sample interval, and selecting a sampling phase to sample each symbol of the stream of data using the integrated transition information.

14 Claims, 6 Drawing Sheets

APPARATUS AND METHODS FOR BURST MODE CLOCK AND DATA RECOVERY FOR HIGH SPEED SERIAL COMMUNICATION LINKS

PRIORITY APPLICATION

This application claims the benefit of priority under 35 U.S.C. 119(e) to Mactaggart et al., U.S. Provisional Patent Application Ser. No. 62/146,752, filed on Apr. 13, 2015, and to Mactaggart et al., U.S. Provisional Patent Application Ser. No. 62/174,678, filed on Jun. 12, 2015, both of which are hereby incorporated herein by reference in its entirety.

BACKGROUND

Various communication protocols such as IEEE 802.3, also known as Ethernet, use serial communication protocols. These protocols may use electrical signaling for the entire path, or combination of electrical and optical signaling for different parts of the path. Most of the high speed protocols use an embedded clock in the data stream. Clock and data recovery (CDR) circuits are used to recover the data at the destination. Various communications protocols such as Ethernet PON (IEEE 802.3ah and IEEE 802.3av) perform switching of signals from different sources such that at the receiver, the data stream from each source may have a different phase and/or a different frequency. Optical switched signals such as Passive Optical Networks (PON) have multiple sources sharing a data channel on a time division multiplexed (TDM) basis. TDM time slots are often referred to as frames. Each of the sources can be unique and may have a unique phase, a unique frequency offset, and the phase and/or frequency may be unknown to the receiver. Reacquisition of phase, and potentially frequency, is performed at the beginning of each frame. For these types of systems it is desirable to have rapid phase and frequency acquisition in the receiver to make maximum use of the time and bandwidth of the switched channel. Two steps may be required, the determination of when bit level phase acquisition can be started, often referred to as frame synchronization, and the actual bit level frequency and/or phase acquisition, often referred to as clock and data recovery (CDR). Uncertainty in (1) when to start the phase acquisition and (2) the time it takes to complete phase acquisition are wasted time on the channel.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Serial communications channels can have clock and data recovery (CDR) circuits. If the source of the signal changes in normal operation, rapid lock of the CDR to the transmit data can be desirable. Optical systems such as passive optical networks (PON) are an example of systems where the data source is switched. CDRs that lock to data very rapidly are often referred to as Burst Mode CDRs (BM-CDR). The present inventors have recognized methods and apparatus for rapid determination of the phase of input data in the presence of noise, jitter and duty cycle distortion (DCD), and for rapid adjustment of sampling phase for such input data. In certain examples of BM-CDR, the present inventors have also recognized that it can be desirable to have a means of synchronizing the data sources so that there is never more than one source that is transmitting to a given receiver, and so that the dead time between switching from one data source to another data source is minimized. In certain examples, this synchronization can also provide a higher precision method of defining when the phase determination can be accurately initiated at a receiver. This synchronization can also be referred to as frame synchronization.

Figure 1:
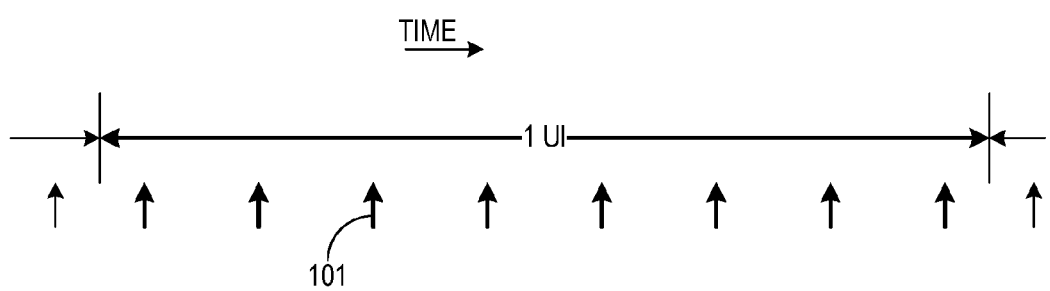
FIG. 1 illustrates generally an example of an oversampled unit interval of data from an incoming stream of information.

In communications systems it can be typical to divide time into symbol unit intervals (UI). A UI can be the time required to transmit one symbol. In non-return-to-zero (NRZ) systems, each symbol can contain one bit of information, and in other systems such as pulse-amplitude modulation (PAM) each symbol can contain multiple bits of information. The task of clock and data recovery is to determine the center of each symbol, which can be determined by finding the symbol edges or symbol transitions, and applying an approximately one-half UI offset from a symbol edge. In the technique described in this application, a unit interval (1 UI) can be oversampled, typically by 4 or 8 sampling points 101, as shown in FIG. 1. It is understood that a UI can be oversampled at other quantities of sampling points without departing from the scope of the present subject matter. In certain examples, comparisons of the sample values of adjacent samples can assist in determining the time-wise location of symbol transitions. Although the samples 101 shown in FIG. 1 are uniformly spaced, in certain examples, non-uniform spacing of the samples can be advantageous. If there is prior knowledge of where the transitions are expected, more resolution of the transition can be obtained by concentrating the samples around the expected transition region. Alternatively, the samples can initially be uniformly spaced, and then moved to the transition region as knowledge of where the transition region is located is obtained.

Figure 2:
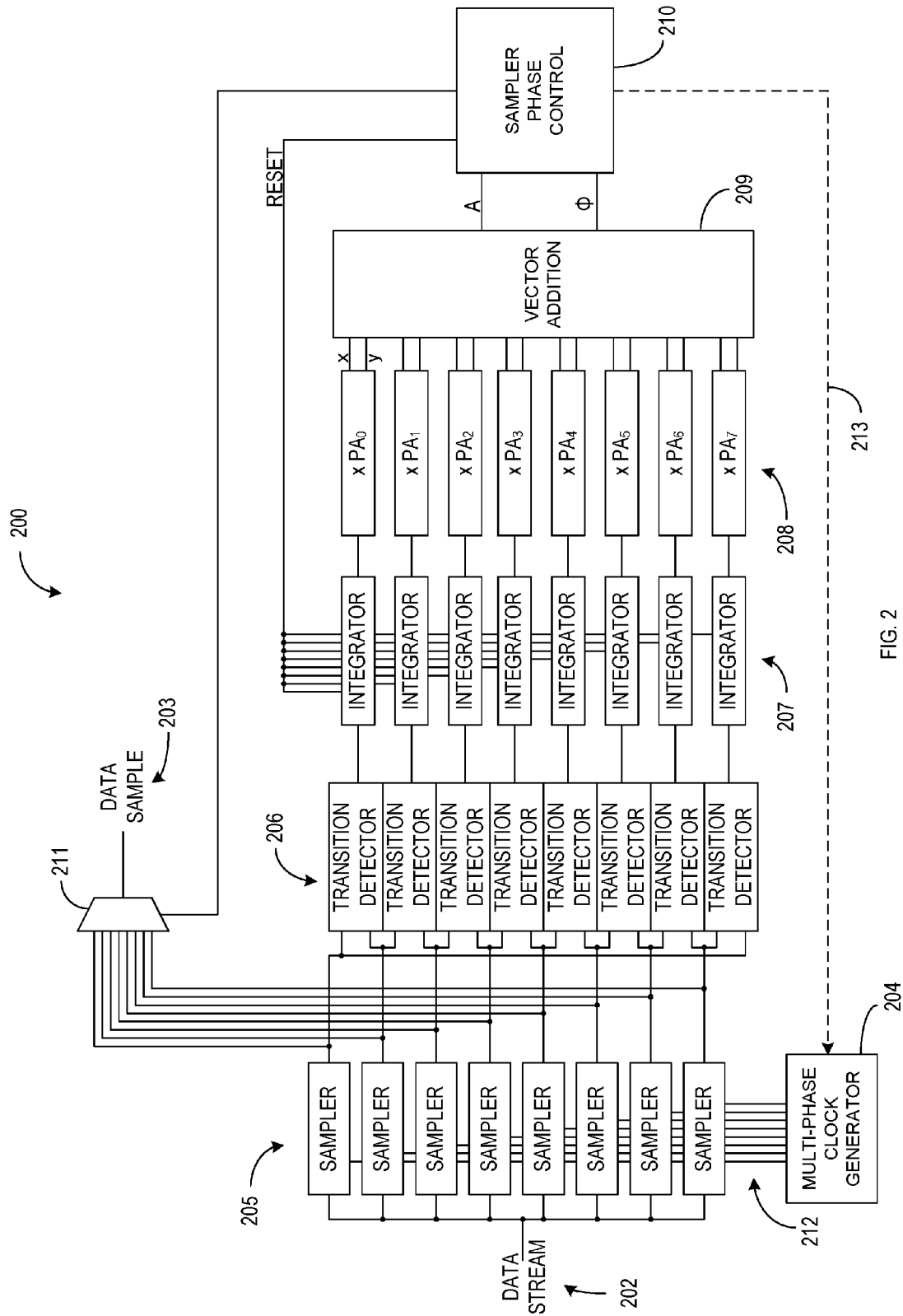
FIG. 2 illustrates generally an example initialization circuit for quickly detecting a robust sampling location of an incoming stream of information.

FIG. 2 illustrates generally an example initialization circuit 200 for quickly detecting a robust sampling location of an incoming stream of information (DATA STREAM). The circuit 200 can include an input 202 for receiving the data stream, a data sample output 203, a multiple-phase clock generator 204, multiple samplers 205, multiple transition detectors 206, multiple integrators 207, multiple vector circuits 208, a vector addition circuit 209, a sampler phase controller 210, and a sample selection switch or multiplexer 211. In certain examples, a main CDR controller (not shown) can enable and disable the initialization circuit 200.

In certain examples, the multiple-phase, or multi-phase, clock generator 204 can receive a reference clock signal or can generate a reference clock signal to serve as a basis for sampling individual bits or symbols of the incoming stream of information (DATA STREAM). In certain examples, a reference clock signal can have a nominal frequency that is equal to a predetermined symbol or bit frequency of the incoming data stream, or has an integer ratio relationship to the data frequency. The multiple phase generator 204 can provide multiple sampling clock signals 212. Each of the sampling clock signals 212 can have the nominal frequency and a known phase relationship with each of the other sampling clock signals 212. In the illustrated example, the multi-phase clock generator 204 can provide 8 sampling clock signals 212 with each sampling clock signal having transitions that are offset by about 45 degrees from timewise adjacent sampling clock signals. Each sampling clock signal can trigger one of the multiple samplers 205. As discussed above, other non-uniform phase relationships can also be used for the plurality of sampling clock signals.

Upon receiving a transition in a sampling clock signal 212, a sampler 205 can sample the state of the data stream and provide the sampled state at two outputs of the sampler 205. Each transition detector 206 can include two inputs. Each input can receive an output of a sampler 205. In certain examples, a first input of a transition detector 206 can receive an output from a first sampler 205 and a second input of the transition detector 206 can receive an output from a second sampler 205. In certain examples, second sampler 205 receives a sampler signal 212 that is immediately offset in phase from the sample signal 212 received by the first sampler 205. For the illustrated example, each transition detector 206 can detect a transition occurring in a 45 degree window of the UI. The full complement of transition detectors 206 is designed to segment the entire UI into contiguous windows with each transition detector 206 detecting a different window. In other examples, only the region of the UI where transitions are expected is segmented into contiguous windows. An output of each transition detector 206 provides an indication of a detected transition between two sample intervals. Each integrator 207 can receive the output of a transition detector 206. Upon an indication of a transition from a transition detector 206, the integrator 207 can integrate or add each indication and pass the integrated total to a corresponding vector circuit 208.

Each vector circuit 208 can receive an integrated value from one of the integrators 207. The vector circuit 208 can associate the integrated value with a phase angle ($PA_x$) to describe a vector associated with a window of the UI. In some examples, the phase angle ($PA_x$) can represent an extreme of one of the contiguous windows. In some examples, the phase angle ($PA_x$) can be a midpoint between the clocks of the samplers 205 providing samples for the integrator 207 that provides the integrated value. In certain examples, the vector circuit 208 can break the vector down into Cartesian coordinates (x,y) and pass the Cartesian coordinates (x, y) to the vector addition circuit 209. It is understood that in certain examples, the vector circuit 208 can change the associate phase angle based on changes in the sample point locations.

The vector addition circuit 209 can receive vector information from the integrators 207 or the vector circuits 208 and can add the vector information to provide a resultant vector. In some examples, the resultant vector can be represented by a magnitude (A) and a phase ($\phi$). In certain examples, the vector information provides probability information for where a transition occurs with respect to the windows of the UI. Adding the vectors provides a resultant vector (A, $\phi$) indicative of the most likely location of data transitions of the data stream relative to the UI windows. With knowledge of the most likely location of data transitions, the sampler phase controller 210 can use the sample selection switch 211 to select the samples associated with the sampling phase clock signal 212 that is closest to 180 degrees from the phase ($\phi$) of the resultant vector (A, $\phi$). The associated sampling phase clock signal represents the best probability of sampling the data at a midpoint between state changes of the incoming data stream. In certain examples, the sampler phase controller can alternatively change the phase of the sampling clock signals 212 using a feedback path 213 so that the sampler 205 used for data collection is 180 degrees from the transition point. Using this technique, the phase resolution of the sampling phase clock signals 212 can be equal to, greater than, or less than the phase resolution of the samplers 205. In certain examples, the sampler phase controller 210 can reset the integrators and can collect another interval of the samples to verify or continuously monitor and optionally adjust the multi-phase clock generator such that the actual sample clock or sample clock phase signal is located in the best position in the UI to robustly sample the symbols of the data stream. When collecting another interval of samples, the sampling points can be the same as the previous interval, or can be changed to enhance resolution.

Figure 3:
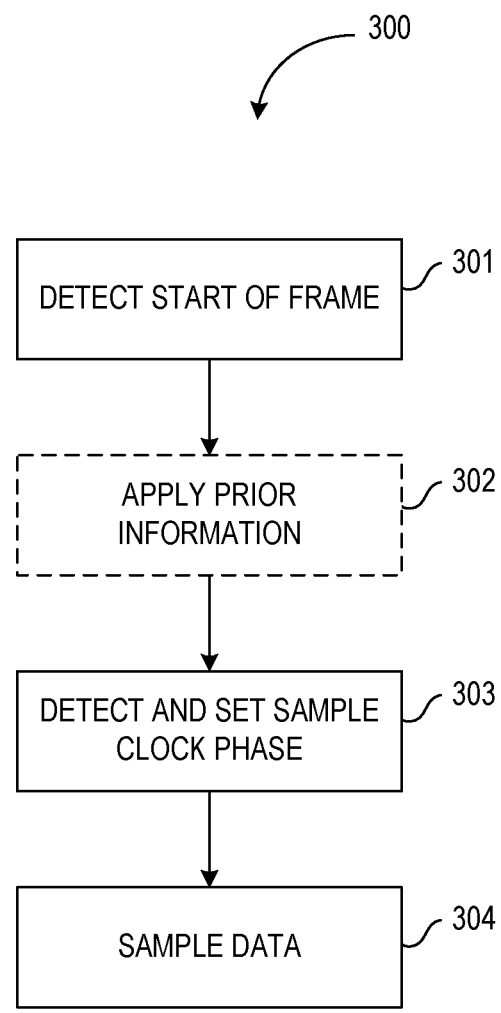
FIG. 3 illustrates generally a flowchart for an example of a method for operating a burst type CDR channel.

FIG. 3 illustrates generally a flowchart for an example of a method 300 for operating a burst type CDR channel. The method 300, at 301 can include detecting a burst mode event on the channel such as by detecting the start of a frame. In certain examples, detecting the burst mode event can include detecting a synchronization signal on the channel. In other examples, detecting the start of the frame can include detecting an out of band (not on the channel) synchronization signal. In some examples, detecting the start of the frame can include the generation of a synchronization signal based on a defined synchronization method. At 303, the phase location of transitions of the unit intervals can be detected and the phase of the sampling clock can be set based on the phase location of the transitions. At 304, the data can be sampled and processed using the sampling signal having a phase based on the detected transitions. In certain examples, at 302, any prior knowledge of the frequency and phase may optionally be applied prior to phase and/or frequency acquisition using techniques described herein. If the source is known through out-of-band information, the prior knowledge can be based on the acquired frequency and/or phase from previous frames when the same source was generating the data. These can be referred to as "go to phase" or "go to frequency" functions. Although burst has been discuss in the context of switched systems, it is understood that these same concepts can be used in non-switched systems that desire fast and high quality initial lock or, for example, re-lock after exiting an idle reduced power mode. In certain examples, a burst type CDR channel can operate at 25 gigabits per sec or more, a UI can be about 40 picoseconds or less, and locking on to a stream of data can occur within less than a couple hundred UI or less than about 10 nanoseconds. In some examples, phase lock accuracy can be within 10% or less of the UI.

Figure 4:
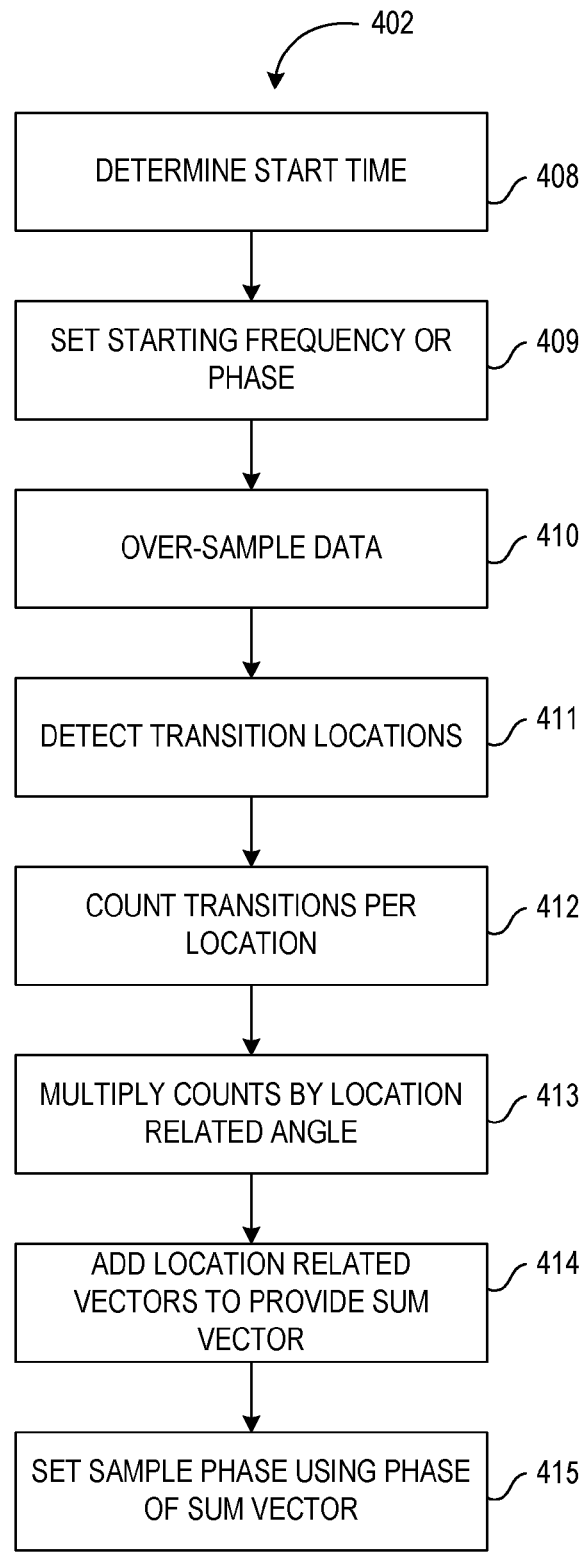
FIG. 4 illustrates generally a flowchart for an example of a method to detect transition locations of a stream of data and set a sample clock phase to provide robust symbol samples from the stream of data.

FIG. 4 illustrates generally a flowchart for an example of a method 402 to detect transition locations of a stream of data and set a sample clock phase to provide robust symbol samples from the stream of data. At 408, the optimum time to start the acquisition is determined. In certain examples, an optimum time to start a burst acquisition is immediately after the incoming signal is valid and has a stable phase. Frame synchronization, as described below, provides various methods for accurately determining and communicating when to start the burst acquisition. At 409, the initial frequency and phase is set. At 410, the data stream can be oversampled by sampling the data stream multiple times during each UI. At 411, time-wise adjacent samples can be compared to detect a level transition of the data stream. At 412, each transition can be counted. In certain examples, separate count totals can be kept for each set of time-wise adjacent samples. At 413, each count total can be multiplied by a predetermined phase angle. The predetermined phase angle can be associated with the set of samples used to provide the count total. In certain examples, the multiplication process can provide Cartesian coordinates associated with a vector having a magnitude equal to the count total and a phase equal to the predetermined phase. At 414, the vectors associated with each time-wise adjacent set of samples can be added to provide an indication of the most probable location of data transitions within a UI. At 415, the actual sampling phase signal used to sample the data stream can be set or can be corrected such that the phase of the sampling phase symbol is approximately 180 degrees offset from the most probable location of data transitions detected above. It is understood that small offsets from 180 degrees may provide a lower bit error rate (BER) if the input signal has certain asymmetries. In certain examples, setting or adjusting the phase of the sampling phase signal can include using a multiplexer to select one of the oversampling clock signals used to detect the most probable location of data transitions, can include using a multiplexer to select one of the samples provided by the samplers, or can include adjusting a phase of a clock generator used to provide the sampling clock signals.

Figure 5:
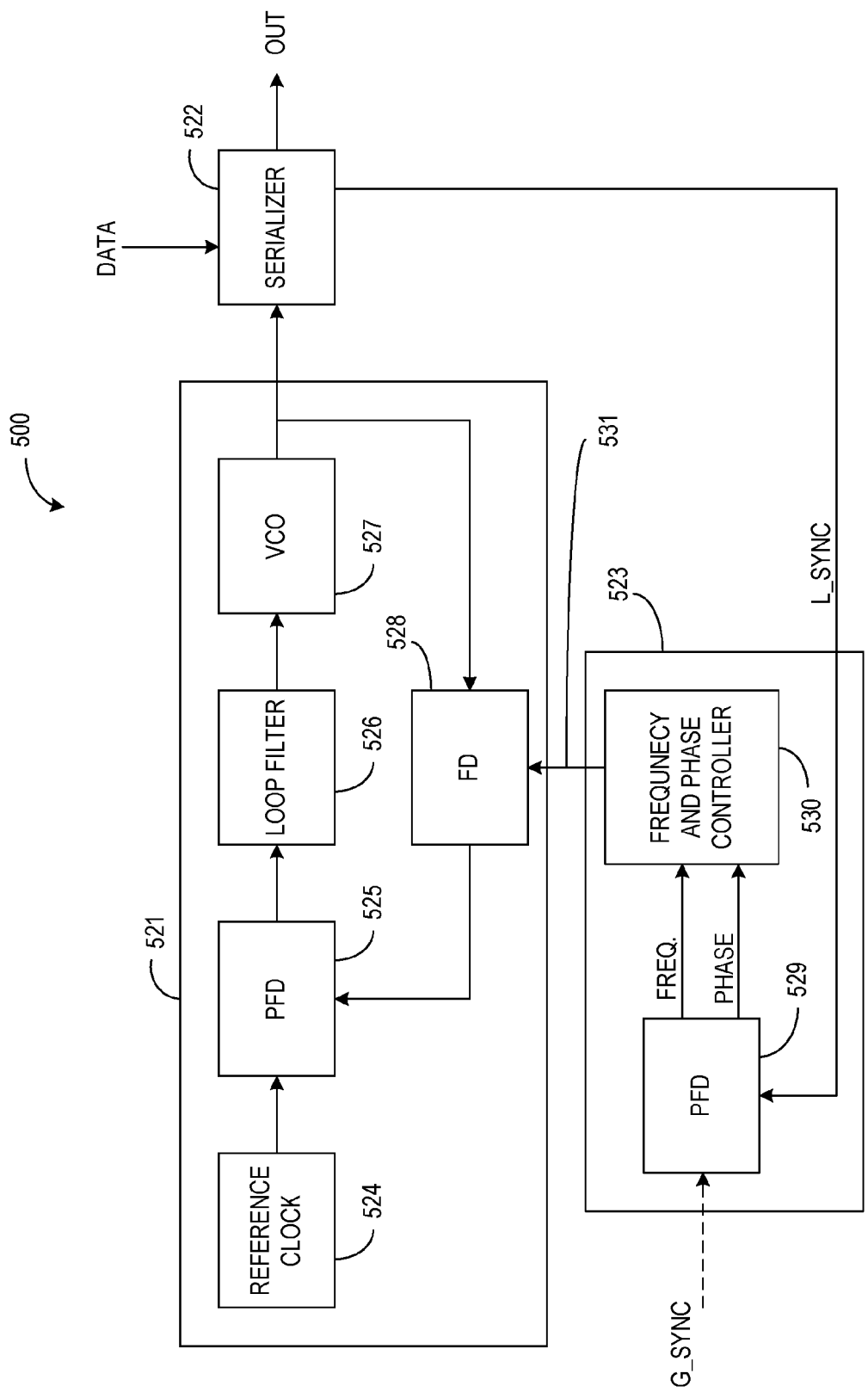
FIG. 5 illustrates generally an example of a system for synchronizing transmitter data sources.

FIG. 5 illustrates generally an example of a transmit circuit 500 for synchronizing transmitter data sources of a burst transceiver. In certain examples, the burst transceiver, including the transmit circuit 500, is a slave in a system that shares one or more channels with other slave transceivers. Each slave can be scheduled to burst transmit on the channel such that communications using the channel do not clash. In some examples, each slave receiver can receive all the data put on the channel by the other slaves as well as data put on the channel by a master transceiver. In such systems, a slave transceiver that is scheduled to transmit can receive the last bits of data from the immediately preceding burst, delay a predetermined interval, and then transmit. In some systems, a master controller can determine the time allocations and can notify each transceiver, or individual transmitters and receivers, when the next time slot is scheduled to start. This notification can be in the form of start of global frame synchronization signal (G_SYNC). There can be an uncertainty in when the global frame synchronization signal (G_SYNC) will be received and recognized at each transceiver, which can also results in a delay of a predetermined interval between the end of one frame and the start of the next frame. The example transmit circuit 500 and method for operating the transmit circuit can reduce the predetermined interval, thus, making the overall system more efficient. In certain examples, the transmit circuit 500 can include a transmit phase lock loop (PLL) 521, a data serializer 522 and a synchronization circuit 523. The transmit PLL 521 can receive a reference clock or can include a reference clock generator 524, phase frequency detector (PFD) 525, a loop filter 526, a voltage controlled oscillator 527 and a feedback fractional divider 528. In some examples, the fractional divider can include the circuits described in U.S. Pat. Nos. 8,319,563 and 8,890,595. The transmit PLL 521 can provide a transmit frequency clock signal to the serializer 522 and the serializer 522 can use the transitions of the transmit frequency clock signal to incorporate the transmit data (DATA) into the transmit signal (OUT). To assist in minimizing delays between the end of one data burst from a first transceiver and the beginning of a data burst from another transceiver on the system, each transceiver can include a synchronization circuit 523, which can control the fractional divide value of the PLL 521 using a frequency code word 531 generated at a controller 530 of the synchronization circuit 523 and received at the fractional divider 528 of the transmit phase lock loop 521. In certain examples, the synchronization circuit 523 can function as another PLL and can synchronize the data frequency and phase of the transmit phase lock loop 521 to the global frame synchronization signal (G_SYNC). In such an example, all transmitters can start on the initiating edge of global frame synchronization signal (G_SYNC). A programmable delay can be added to the output synchronization circuit 523 to calibrate out system delays or differing delays in the paths individual to the various transmitters. In certain examples, the synchronization circuit 523 can include a phase frequency detector 529, and a controller 530. In some examples, the serializer 522 can provide an local frame synchronization signal (L_SYNC) indicative of the actual frame location of the transmit circuit 500. The phase detector 529 can provide information indicative of offset between the global frame synchronization signal (G_SYNC) and the local frame synchronization signal (L_SYNC) such that the frame start location of the serializer 522 can be finely adjusted to better locate the frames of the transmitted data with the global frame synchronization signal (G_SYNC) After a particular transmit circuit has settled, the value of the fractional divide can specify the data rate relative to the reference clock frequency, which can be used by other transmitters or receivers that are intended to operate at the same data rate or a data rate that is proportional to the transmitter data rate.

Similar to FIG. 5, the global frame synchronization signal (G_SYNC) and a receiver synchronization circuit can be used to generate a signal indicating when the burst receiver can expect to receive the start of a frame of the burst sequence. In various examples, the global frame synchronization signal (G_SYNC) can be an out of band signal, or it can be generated by detecting a defined pattern in the data stream. A programmable delay can be inserted in the synchronization circuit to account for system delays and uncertainties, and for the variations in the individual delays of the various channels. Similar to the transmitter circuit, after the burst receiver circuit has settled, the value of the fractional divide can specify the data rate relative to the reference clock frequency. This value can be used for future acquisitions from the same source, or it can be used by other transmitters or receivers for example by distributing the frequency code word 531. A significant advantage of this approach is that both the transmitter and receiver clocks can be directly referenced to a high quality reference clock, which imposes the low noise of the reference clock on the transmitter data generation clock or the receiver data sampling clock.

Figure 6:
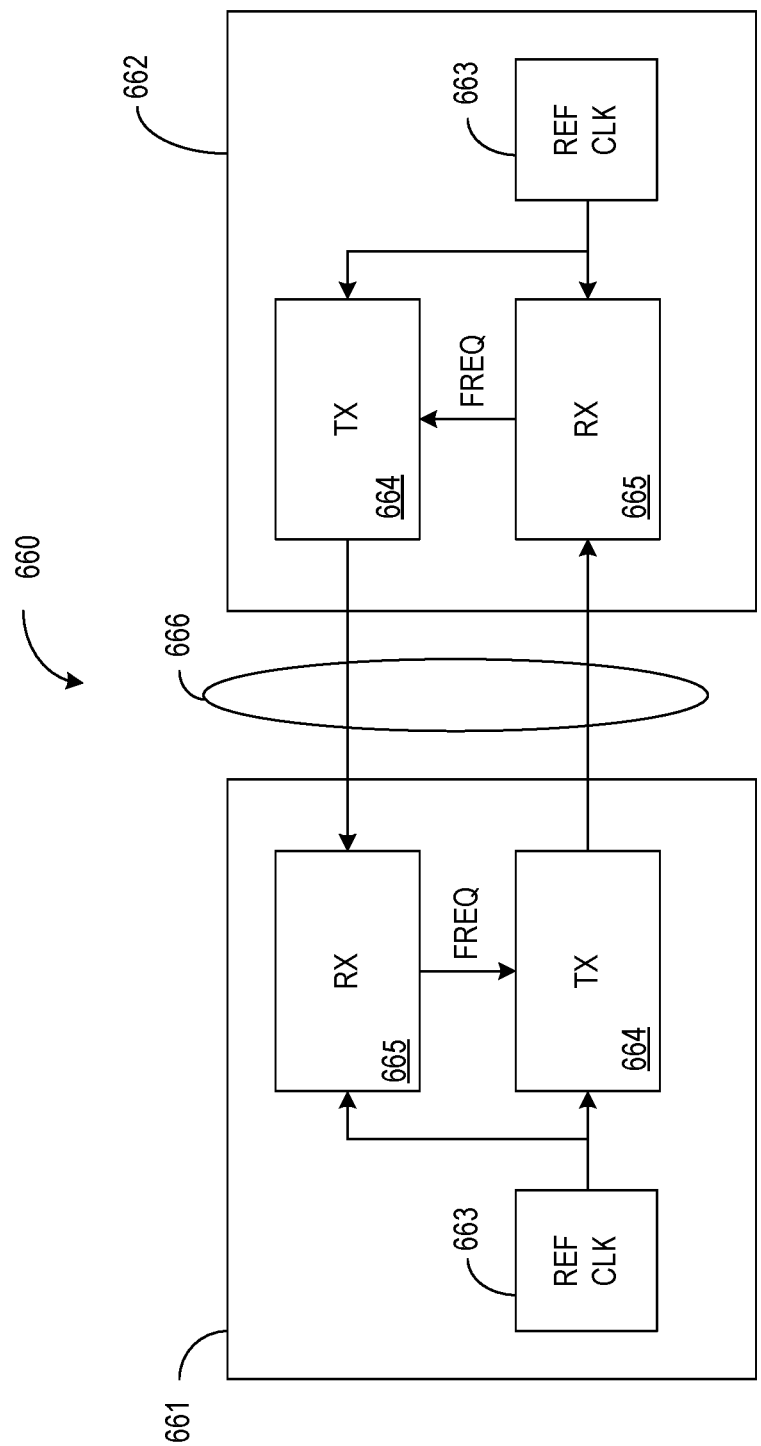
FIG. 6 illustrates a system that can use an acquired receiver frequency to control a transmitter frequency of a high speed serial link.

FIG. 6 illustrates a system 660 that can use an acquired receiver frequency (FREQ) to control a transmitter frequency. In certain examples, sharing of frequency information between communication components can accelerate the process of acquiring both frame synchronization and bit level sampling phase lock (CDR). The system 600 can include a first transceiver 661 and a second transceiver 662. Each transceiver 661, 662 can include a reference clock generator 663, a transmitter 664 and a receiver 665. The first transceiver 661 and the second transceiver 662 can be coupled together via a serial communication link 666. In many systems it can be desirable to transmit at the same data rate as the receive data rate so that there is no overrun or underrun of data. In certain examples, frequency or phase information, for example in the form of a frequency code word (FREQ) can be provided by a receiver 665 to one or more transmitters 664 to allow the transmitter to transmit at the actual receive frequency or ratio thereof. In some examples, sharing the frequency code word (FREQ) can also allow links to operate at certain frequency ratios by scaling a fractional divider value. The desire to operate at certain frequency ratios can occur when multiple channels are aggregated, for example, to less channels with higher data rates, or de-aggregated to more channels with lower data rates. The desire to operate at certain frequency rations can also occur when the input and output forward error correction (FEC) overheads are different. Differences in FEC overheads may occur in systems with variable FEC, where the level of FEC used is dependent on the signal integrity of the link. Links with higher data error rates use a stronger FEC with higher overhead, and links with lower error rates use a weaker FEC. A link with a higher overhead can operate at a slightly higher symbol rate to achieve the same overall data throughput.

It is understood that the saving and/or compilation of frequency and phase history from each source can be performed in certain examples, without departing from the scope of the present subject matter. In certain examples, the system 600 can include a processor or processing circuits and memory to save and retrieve historical phase and frequency information. Such saved information can be used as a starting point for future frequency and phase acquisition from the same source. Such a method may further accelerate the signal acquisition time. In addition, although examples are described herein as transceivers, where applicable, the concepts can be applied to individual transmitters and individual receivers not in a transceiver configuration.

In certain examples, a communication system can include frame synchronization. Frame synchronization can include receiving a global synchronization signal at a multiple channel communication device and using the global synchronization signal to phase lock a serializer PLL or deserializer PLL of one or more of the channels. In certain examples, a global frame synchronization signal can be derived from defined patterns in the data stream. In certain examples, the frequency of the global synchronization signal can be used to set the frequency of each PLL. In some examples, the PLL frequency can be set using a fractional feedback divide PLL. In certain examples, the fractional feedback divide PLL can include one or more of the circuits described in U.S. Pat. Nos. 8,319,563 and 8,890,595 hereby incorporated by reference herein in their entirety. In some examples, an analog fractional divide PLL can be locked to a high quality clock to minimize PLL jitter. Such a clock can include, but is not limited to, quartz crystal oscillator. In certain examples, a programmable delay circuit can be used to shift a local start of a frame signal such as a local SYNC signal.

In certain examples, a data transceiver can include a PLL with a fractional divider and can adjust the fractional divider to lock the transceiver onto the frequency or phase of a data stream. In certain examples, a clock and data recovery (CDR) circuit includes the data transceiver. In certain examples, the data transceiver can use a global synchronization signal to lock on to a frequency or phase of the data stream. In some examples, a receiver of the transceiver can adjust the fractional divider to set the receiver sample phase or sample frequency and the receiver sample phase or sample frequency can be used to control the transmitter of the transceiver.

In certain examples, the present subject matter provides apparatus and methods for reducing lock-on times of serial link communication systems. IN certain examples, apparatus and methods are provided that can assist serial link receivers in determining an optimal frequency and phase for sampling individual bits or symbols of incoming streams of information. In certain examples, frequency information associated with receiving the stream of information at the receiver can be shared with other channels of the system such as by sending a frequency code word to a fractional divider of the other channel. In certain examples, transmitters can align frames of the stream of information with a global frame synchronization signal. Fine adjustment of a transmit clock generator of the serializer can be accomplished by comparing the global frame synchronization signal with an actual or local frame synchronization signal generated by the serializer and adjusting a fractional divider or the transmit clock generator. In some examples, the global frame synchronization signal can be receive by a receiver and can be used by a deserializer to quickly lock on to the beginning of a frame of the stream of information. Present systems can miss one or more frames of information before the receiver locks on to the proper bit or symbol sample position of incoming stream and also to the proper frame sampling of the incoming stream. The present subject matter can reduce such lock on time to a small fraction of a frame time to achieve deterministic lock time for both bit sampling and frame synchronization.

ADDITIONAL NOTES AND EXAMPLES

In Example 1, a method for operating a burst mode communication device can include receiving initial data of a stream of information at a burst receiver of the burst mode communication device, sampling the stream of information a plurality of times per unit interval to provide a plurality of sample intervals, integrating transition information for each sample interval, and selecting a sampling phase to sample each symbol of the stream of data using the integrated transition information.

In Example 2, the sampling of Example 1 optionally includes associating a phase angle with each of the sample intervals.

In Example 3, the selecting of any one or more of Examples 1-2 optionally includes individually multiplying the integrated transition information for each of the plurality of sample intervals by the phase angle associated with the sample interval to provide a transition vector for each of the sample intervals.

In Example 4, the selecting of any one or more of Examples 1-3 optionally includes summing together the transition vector for each of the sample intervals to provide a resultant vector.

In Example 5, the selecting of any one or more of Examples 1-4 optionally includes determining a correction angle from the resultant vector.

In Example 6, the selecting of any one or more of Examples 1-5 optionally includes adjusting a phase of a sampling signal using the correction angle from the resultant vector.

In Example 7, the sampling of any one or more of Examples 1-6 optionally is non-uniform during a unit interval.

In Example 8, the method of any one or more of Examples 1-7 optionally includes initializing a first phase lock loop of the burst mode receiver, and wherein initializing the first phase lock loop can include receiving a global synchronization signal at the burst receiver, the global synchronization signal indicative of a start position of a frame of data within the stream of data.

In Example 9, the initializing the first phase lock loop of any one or more of Examples 1-8 optionally includes setting an initial unit interval duration using a frequency of the global synchronization signal.

In Example 10, the method of any one or more of Examples 1-9 optionally includes sharing a value of the unit interval with a transmitter of the burst mode communication device.

In Example 11, a burst mode clock and data recovery circuit can include a clock generator configured to provide a clock transition for effectively capturing each data bit of a stream of data, a sample phase controller configured to adjust a phase of the clock transition using an output vector, and a detection circuit configured to oversample an initial portion of the stream of data and to provide the output vector.

In Example 12, the clock generator of any one or more of Examples 1-11 optionally includes a multi-phase clock generator configured to provide a plurality of sample clock signals, each sample clock signal having a unique phase with respect to each other sample clock signal.

In Example 13, the detection circuit of any one or more of Examples 1-12 optionally includes a plurality of sample registers configured to receive the input stream of data, each element of data of the input stream associated with a unit interval, each sample register of the plurality of sample registers further configured to receive a sample clock signal of the plurality of sample clock signals and to sample the input stream using the sample clock.

In Example 14, the detection circuit of any one or more of Examples 1-13 optionally includes a plurality of transition detectors, each transition detector configured to receive a plurality of samples from a corresponding sample register of the plurality of sample registers and to provide transition information about the plurality of samples.

In Example 15, the detection circuit of any one or more of Examples 1-14 optionally includes a plurality of integrators, each integrator of the plurality of integrators configured to receive the transition information from a corresponding transistor detector of the plurality of transition detectors, to integrate the transition information to provide integrated transition information about the plurality of samples and to provide a vector representative of the integrated transition information and a phase associated with the sample clock signal.

In Example 16, the detection circuit of any one or more of Examples 1-15 optionally includes a vector addition circuit configured to add a plurality of vectors from the plurality of integrators and to provide the output vector.

In Example 17, the burst mode clock and data recovery circuit of any one or more of Examples 1-16 optionally includes a multiplexer configured to receive a sample from each sample register of the plurality of sample registers, to receive a control signal from the sample phase controller, and provide a selected sample to an output of the multiplexer in response to the control signal.

In Example 18, at least one machine readable storage medium comprising a plurality of instructions for detecting a sampling phase of a stream of information that when executed by a computing device cause the computing device to receive initial data of the stream of information sample the stream of information a plurality of times per unit interval to provide a plurality of sample intervals, associate a phase angle with each of the sample intervals, integrate transition information for each sample interval, and select a sampling phase to sample each symbol of the stream of data using the integrated transition information.

In Example 19, the at least one machine readable medium of any one or more of Examples 1-18 optionally comprising instructions that when executed by the computing device cause the computing device to individually multiply the integrated transition information for each of the plurality of sample intervals by the phase angle associated with the sample interval to provide a transition vector for each of the sample intervals.

In Example 20, the at least one machine readable medium of any one or more of Examples 1-19 optionally comprising instructions that when executed by the computing device cause the computing device to sum together the transition vector for each of the sample intervals to provide a resultant vector.

In Example 21, the at least one machine readable medium of any one or more of Examples 1-20 optionally comprising instructions that when executed by the computing device cause the computing device to determine a correction angle from the resultant vector.

In Example 22, the at least one machine readable medium of any one or more of Examples 1-20 optionally comprising instructions that when executed by the computing device cause the computing device to adjust a phase of a sampling signal using the correction angle from the resultant vector.

In Example 23, a burst mode communication system can include a transmitter, the transmitter can include a first transmit phase lock loop, configured to provide a transmit frequency signal, a serializer configured to receive transmit data and to provide a transmit data signal by a serial representation of the transmit data within the transmit frequency signal, wherein the serializer is configured to provide a local frame synchronization signal indicative of a start location of a frame of the transmit data signal, and a second transmit phase lock loop configured to receive a global frame synchronization signal and the local transmit frame synchronization signal and to adjust a fractional divider of the first transmit phase lock loop to synchronize the local transmit frame synchronization signal with the global frame synchronization signal.

In Example 24, the system of any one or more of Examples 1-23 optionally includes a receiver, the receiver can include a first receive phase lock loop, the first receive phase lock loop configured to provide a receive frequency signal, a deserializer configured to receive a stream of data and to deserialize the stream of data using the receive frequency signal, and to provide data words from the stream of data, and wherein the deserializer configured to provide a local receive frame synchronization signal indicative of the expected start location of a frame of the stream of data, and a second receive phase lock loop configured to receive the global frame synchronization signal and the local receive frame synchronization signal and to adjust a fractional divider of the first receive phase lock loop to synchronize the local receive frame synchronization signal with the global frame synchronization signal.

In Example 25, the receiver of any one or more of Examples 1-24 optionally includes a clock generator configured to provide a clock transition for effectively capturing each data bit of a stream of data, a sample phase controller configured to adjust a phase of the clock transition using an output vector, and a detection circuit configured to oversample an initial portion of the stream of data and to provide the output vector.

In Example 26, a burst mode communication system can include a receiver, the receiver can include a first receive phase lock loop, the first receive phase lock loop configured to provide a receive frequency signal, a deserializer configured to receive a stream of data and to deserialize the stream of data using the receive frequency signal, and to provide data words from the stream of data, and wherein the deserializer configured to provide a local receive frame synchronization signal indicative of the expected start location of a frame of the stream of data, and a second receive phase lock loop configured to receive the global frame synchronization signal and the local receive frame synchronization signal and to adjust a fractional divider of the first receive phase lock loop to synchronize the local receive frame synchronization signal with the global frame synchronization signal.

Example 27 can include, or can optionally be combined with any portion or combination of any portions of any one or more of Examples 1 through 26 to include, subject matter that can include means for performing any one or more of the functions of Examples 1 through 26, or a machine-readable medium including instructions that, when performed by a machine, cause the machine to perform any one or more of the functions of Examples 1 through 26.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for operating a burst mode communication device, the method comprising:
   receiving initial data of a stream of information at a burst receiver of the burst mode communication device;
   sampling the stream of information a plurality of times per unit interval to provide a plurality of sample intervals;
   associating a phase angle with each of the sample intervals;
   integrating transition information for each sample interval;
   selecting a sampling phase to sample each symbol of the stream of data using the integrated transition information; and
   wherein the selecting includes individually multiplying the integrated transition information for each of the plurality of sample intervals by the phase angle associated with the sample interval to provide a transition vector for each of the sample intervals.

2. The method of claim 1, wherein the selecting further includes summing together the transition vector for each of the sample intervals to provide a resultant vector.

3. The method of claim 2, wherein the selecting further includes determining a correction angle from the resultant vector.

4. The method of claim 3, wherein the selecting further includes adjusting a phase of a sampling signal using the correction angle from the resultant vector.

5. The method of claim 1, wherein the sampling is non-uniform during a unit interval.

6. The method of claim 1, including initializing a first phase lock loop of the burst mode receiver, wherein initializing the first phase lock loop includes:
receiving a global synchronization signal at the burst receiver, the global synchronization signal indicative of a start position of a frame of data within the stream of data.

7. The method of claim 6, wherein initializing the first phase lock loop includes setting an initial unit interval duration using a frequency of the global synchronization signal.

8. The method of claim 1, including sharing a value of the unit interval with a transmitter of the burst mode communication device.

9. A burst mode clock and data recovery circuit comprising:
a clock generator configured to provide a clock transition for effectively capturing each data bit of a stream of data, the clock generator including a multi-phase clock generator configured to provide a plurality of sample clock signals, each sample clock signal having a unique phase with respect to each other sample clock signal;
a sample phase controller configured to adjust a phase of the clock transition using an output vector; and
a detection circuit configured to oversample an initial portion of the stream of data and to provide the output vector, the detection circuit comprising:
a plurality of sample registers configured to receive the input stream of data, each element of data of the input stream associated with a unit interval, each sample register of the plurality of sample registers further configured to receive a sample clock signal of the plurality of sample clock signals and to sample the input stream using the sample clock;
a plurality of transition detectors, each transition detector configured to receive a plurality of samples from a corresponding sample register of the plurality of sample registers and to provide transition information about the plurality of samples
a plurality of integrators, each integrator of the plurality of integrators configured to receive the transition information from a corresponding transistor detector of the plurality of transition detectors, to integrate the transition information to provide integrated transition information about the plurality of samples and to provide a vector representative of the integrated transition information and a phase associated with the sample clock signal; and
a vector addition circuit configured to add a plurality of vectors from the plurality of integrators and to provide the output vector.

10. The burst mode clock and data recovery circuit of claim 9, including a multiplexer configured to receive a sample from each sample register of the plurality of sample registers, to receive a control signal from the sample phase controller, and provide a selected sample to an output of the multiplexer in response to the control signal.

11. At least one non-transitory machine readable storage medium comprising a plurality of instructions for detecting a sampling phase of a stream of information that when executed by a computing device cause the computing device to:
receive initial data of the stream of information;
sample the stream of information a plurality of times per unit interval to provide a plurality of sample intervals;
associate a phase angle with each of the sample intervals;
integrate transition information for each sample interval;
select a sampling phase to sample each symbol of the stream of data using the integrated transition information;
individually multiply the integrated transition information for each of the plurality of sample intervals by the phase angle associated with the sample interval to provide a transition vector for each of the sample intervals;
sum together the transition vector for each of the sample intervals to provide a resultant vector;
to determine a correction angle from the resultant vector; and
to adjust a phase of a sampling signal using the correction angle from the resultant vector.

12. A burst system comprising:
a transmitter, the transmitter comprising:
a first transmit phase lock loop, configured to provide a transmit frequency signal;
a serializer configured to receive transmit data and to provide a transmit data signal by a serial representation of the transmit data within the transmit frequency signal, wherein the serializer is configured to provide a first local frame synchronization signal indicative of a start location of a frame of the transmit data signal; and
a second transmit phase lock loop configured to receive a global frame synchronization signal and the first local transmit frame synchronization signal and to adjust a fractional divider of the first transmit phase lock loop to synchronize the first local transmit frame synchronization signal with the global frame synchronization signal.

13. The burst system of claim 12, further comprising a receiver, the receiver comprising:
a first receive phase lock loop, the first receive phase lock loop configured to provide a receive frequency signal;
a deserializer configured to receive a stream of data and to deserialize the stream of data using the receive frequency signal, and to provide data words from the stream of data, and wherein the deserializer configured to provide a second local receive frame synchronization signal indicative of the expected start location of a frame of the stream of data, and
a second receive phase lock loop configured to receive the global frame synchronization signal and the second local receive frame synchronization signal and to adjust a fractional divider of the first receive phase lock loop to synchronize the second local receive frame synchronization signal with the global frame synchronization signal.

14. The burst system of claim 13, wherein the receiver includes, a clock generator configured to provide a clock transition for effectively capturing each data bit of a stream of data;

a sample phase controller configured to adjust a phase of the clock transition using an output vector; and a detection circuit configured to oversample an initial portion of the stream of data and to provide the output vector.

* * * * *